(12) United States Patent
Martin

(10) Patent No.: US 9,838,141 B2
(45) Date of Patent: Dec. 5, 2017

(54) ADAPTIVE QUANTUM INFORMATION PROCESSING

(71) Applicant: Keye Martin, Arlington, VA (US)

(72) Inventor: Keye Martin, Arlington, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 476 days.

(21) Appl. No.: 14/027,942

(22) Filed: Sep. 16, 2013

(65) Prior Publication Data

US 2014/0079387 A1    Mar. 20, 2014

Related U.S. Application Data

(60) Provisional application No. 61/701,024, filed on Sep. 14, 2012.

(51) Int. Cl.
  *G06F 17/10*    (2006.01)
  *H04B 10/70*    (2013.01)
  *H04B 10/079*   (2013.01)
  *H04L 9/08*     (2006.01)

(52) U.S. Cl.
  CPC ......... *H04B 10/70* (2013.01); *H04B 10/0795* (2013.01); *H04L 9/0852* (2013.01)

(58) Field of Classification Search
  CPC .... H04L 9/0852; H04B 10/0795; H04B 10/70
  USPC .......................................................... 703/2, 6
  See application file for complete search history.

(56) References Cited

U.S. PATENT DOCUMENTS

| | | | | |
|---|---|---|---|---|
| 7,831,048 B2* | 11/2010 | Kastella | ............... | H04L 9/0858 380/256 |
| 2007/0076871 A1* | 4/2007 | Renes | ................... | H04L 9/0858 380/201 |
| 2010/0034390 A1* | 2/2010 | Yamamoto | ............ | H04L 9/0858 380/278 |
| 2010/0079833 A1* | 4/2010 | Langford | ............... | B82Y 10/00 359/107 |

OTHER PUBLICATIONS

Martin (The Scope of a Quantum Channel, Sep. 13, 2011 (31 pages).*
Martin et al. (A free object in quantum information theory, 2010 (13 pages)).*
Crowder (A quantum representation for involution groups, 2011 (14 pages)).*
Feng, (A domain of Unital Channels, 2008 (10 pages)).*
Cortese (Quantum Information Theory Classical Communication over Quantum Channel, 2003, (167 pages)).*

(Continued)

*Primary Examiner* — Andre Pierre Louis
(74) *Attorney, Agent, or Firm* — U.S. Naval Research Laboratory; William Ladd

(57) ABSTRACT

A method and system for adaptive quantum information processing can be provided by determining a state of a quantum channel governing an environment with a tomography module. Next a scope of the quantum channel can be calculated with a scope algorithm module. Finally, an optimization module can be utilized to optimize the way to quantum mechanically represent information to be transmitted through the quantum channel based on the scope.

16 Claims, 2 Drawing Sheets

(56) References Cited

OTHER PUBLICATIONS

Martin (The Scope of a Quantum Channel, 2011, (31 pages).*
C. H. Bennett, C. A. Fuchs and J. A. Smolin, "Entanglement-Enhanced Classical Communication on a Noisy Quantum Channel" in Quantum Communication, Computing, and Measurement, ed. Hirota et al. (Plenum Press, New York, Oct. 1996), pp. 79-88.
P.S. Bourdon and H.T. Williams, "Unital quantum operations on the Bloch ball and Bloch region," Physical Review A, vol. 69, Article 022314, Feb. 2004.
L. J. Landau and R. F. Streater, "On Birkhoff's theorem for doubly stochastic completely positive maps of matrix algebras," Linear Algebra and its Applications 193, p. 107-127, Nov. 1993.
K. Martin, "A domain theoretic model of qubit channels," ICALP 2008, Lecture Notes in Computer Science, vol. 5126, p. 283-297, Jul. 2008.
K. Martin, How to randomly flip a quantum bit, Electronic Notes in Theoretical Computer Science, vol. 270, Issue 1, p. 81-97, Elsevier Science, Feb. 2011.
M. B. Ruskai, S. Szarek and E. Werner, "An analysis of completely-positive trace-preserving maps on M2," Linear Algebra and its Applications, vol. 347, Issues 1-3, p. 159-187, May 2002.

* cited by examiner

ADAPTIVE QUANTUM INFORMATION PROCESSING

CROSS-REFERENCE TO RELATED APPLICATIONS

This application claims priority to provisional patent application entitled, "Adaptive Quantum Communication," filed on Sep. 14, 2012, and assigned U.S. Application No. 61/701,024; the entire contents of which are hereby incorporated by reference.

FIELD OF THE INVENTION

The invention relates generally to quantum information processing systems. More particularly, the invention relates to a method and system for optimizing the performance of secure quantum information processing systems in a dynamic and noisy environment.

BACKGROUND

The presence of noise can be detrimental, if not disabling, to quantum information systems. Currently, the most developed of all the proposed technologies in quantum information science is quantum communication. For example, it can provide keys whose security appears to be a consequence of physical law, as opposed to the presumed difficulty of factoring numbers. A major limitation of quantum communication, however, is that ensuring its security requires aborting the protocol and restarting when the error rate surpasses a certain threshold. In short, in a sufficiently noisy environment, secure quantum communication is impossible.

Accordingly, there remains a need in the art for an optimized quantum information processing system that can represent information so that the error rate is minimized. This can increase the ability of a quantum information processing system to function efficiently in a noisy environment in many cases where it ordinarily would not.

SUMMARY OF THE INVENTION

According to one aspect of the invention, a method for adaptive quantum information processing can be provided by determining a state of a quantum channel governing an environment with a tomography module. Next, a scope of the quantum channel can be calculated with a scope algorithm module. Finally, a way to quantum mechanically represent information to be transmitted through the quantum channel based on the scope can be optimized utilizing an optimization module.

According to another aspect of the invention, a system for adaptive quantum information processing can be provided that includes a tomography module that can be configured to determine a state of a quantum channel governing an environment. A scope algorithm module can be configured to calculate a scope of the quantum channel. Finally, an optimization module can be configured to optimize the way to quantum mechanically represent information to be transmitted through the quantum channel based on the scope.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

Figure 1:
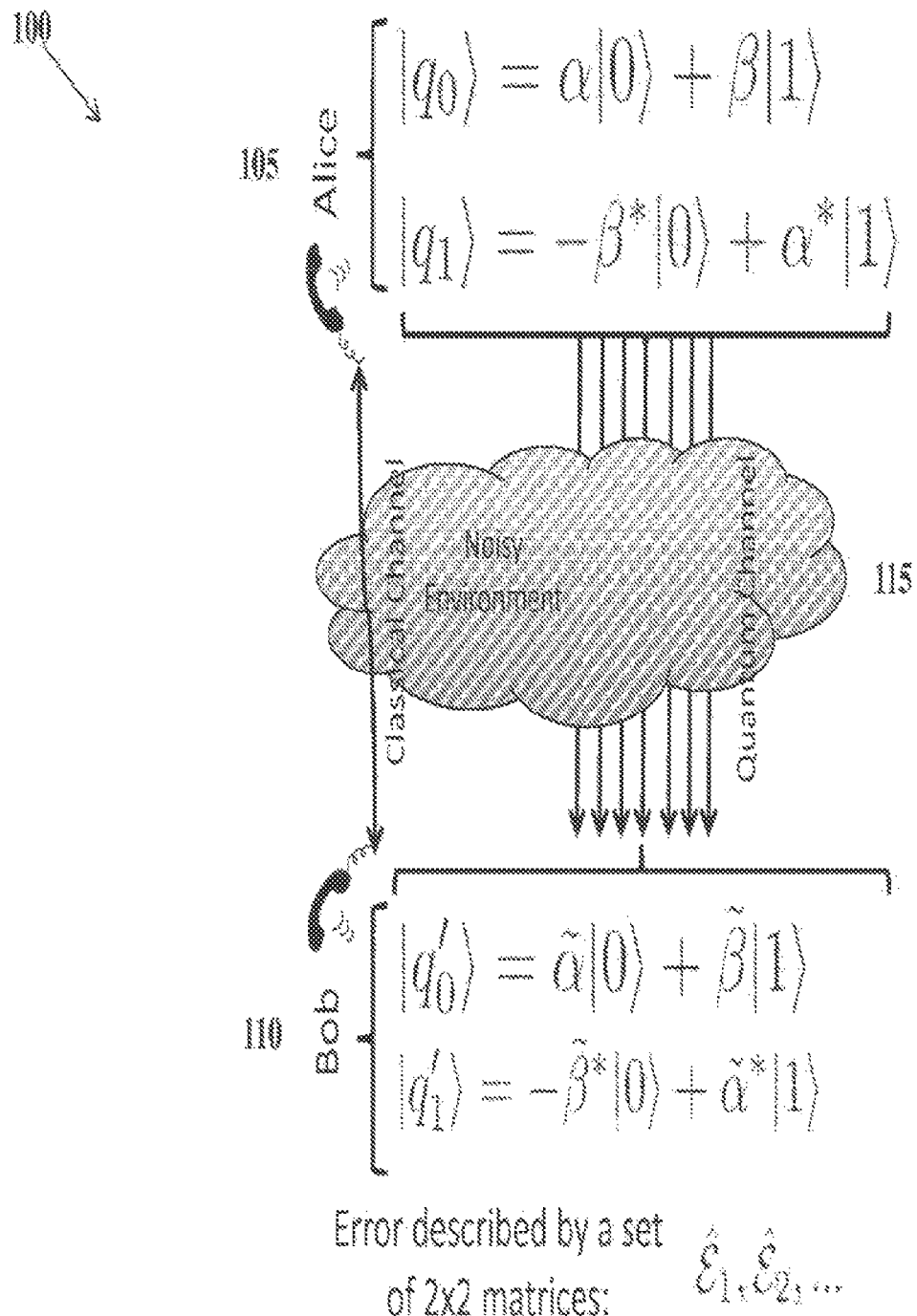
FIG. 1 is a model of a prior art quantum information processing system.

Referring now to the drawings, in which like numerals represent like elements, aspects of the exemplary embodiments will be described in connection with the drawing set.

In general, the present invention can relate to any quantum information processing system, such as quantum sensing, quantum computing, quantum communications, etc. However, the examples below are typically described with respect to quantum communications. Specifically, the comparison of the prior art Quantum Key Distribution (QKD) communication system with the exemplary embodiment of the invention described herein.

In general, classical communication is understood as being the following process: a sender takes some information, represents it in a certain way, sends this representation to a receiver, who then performs some operation on the representation to extract the information. To measure the amount of information being transmitted through a channel, one needs some way of measuring the correlation between the sent and the received. Many factors can affect the amount of information that gets transmitted, the most well-known being noise in the environment. Ultimately, the capacity of a classical channel can be represented by a single number that to a large extent captures its ability to transmit information.

In quantum information processing systems, this process can be expounded by transmitting classical information through a noisy quantum channel, which can depend on how that information is represented. Though analogous notions exist for quantum channels, the use of a single number to represent the capacity of the channel is not particularly informative. For instance, any basis of the state space can be used to represent classical bits, and each representation leads to a classical channel with a capacity all its own. So the ability of a quantum channel to transmit information should minimally depend on all of the different ways classical bits can be represented: instead of a single number, it can be measured with a set of numbers.

FIG. 1 is a model of a prior art quantum information processing system 100. More specifically, FIG. 1 is a model of a quantum communication system, such as Quantum Key Distribution (QKD), which is well-known to one of ordinary skill in the art, and available in commercial systems. QKD can allow two parties, Alice 105 and Bob 110, to establish a shared key without a third party learning the information. That is, QKD can use quantum mechanics to guarantee secure communications between Alice 105 and Bob 110 through a noisy environment 115. QKD utilizes two defined ways to represent the classical bits to transmit them through the quantum channel.

In secure quantum communication, the number of bits that can be transmitted requires the shared key to be of the same size, so the speed at which the information is transmitted depends on how fast the keys can be generated. If the error rate within a session of QKD is too high, the process has to be started over, which slows the key generation rate. Key generation rates can be important because not only it is desirable to communicate as fast as possible, but also because there are times when it is the only way for communication to be possible. For example, in free space, typically there are, at best, five to six minutes to transmit information to a satellite before the satellite is out of reach. By minimizing the error rate, the less likely the process has to be restarted, which can speed up the rate at which information is transmitted.

Figure 2:
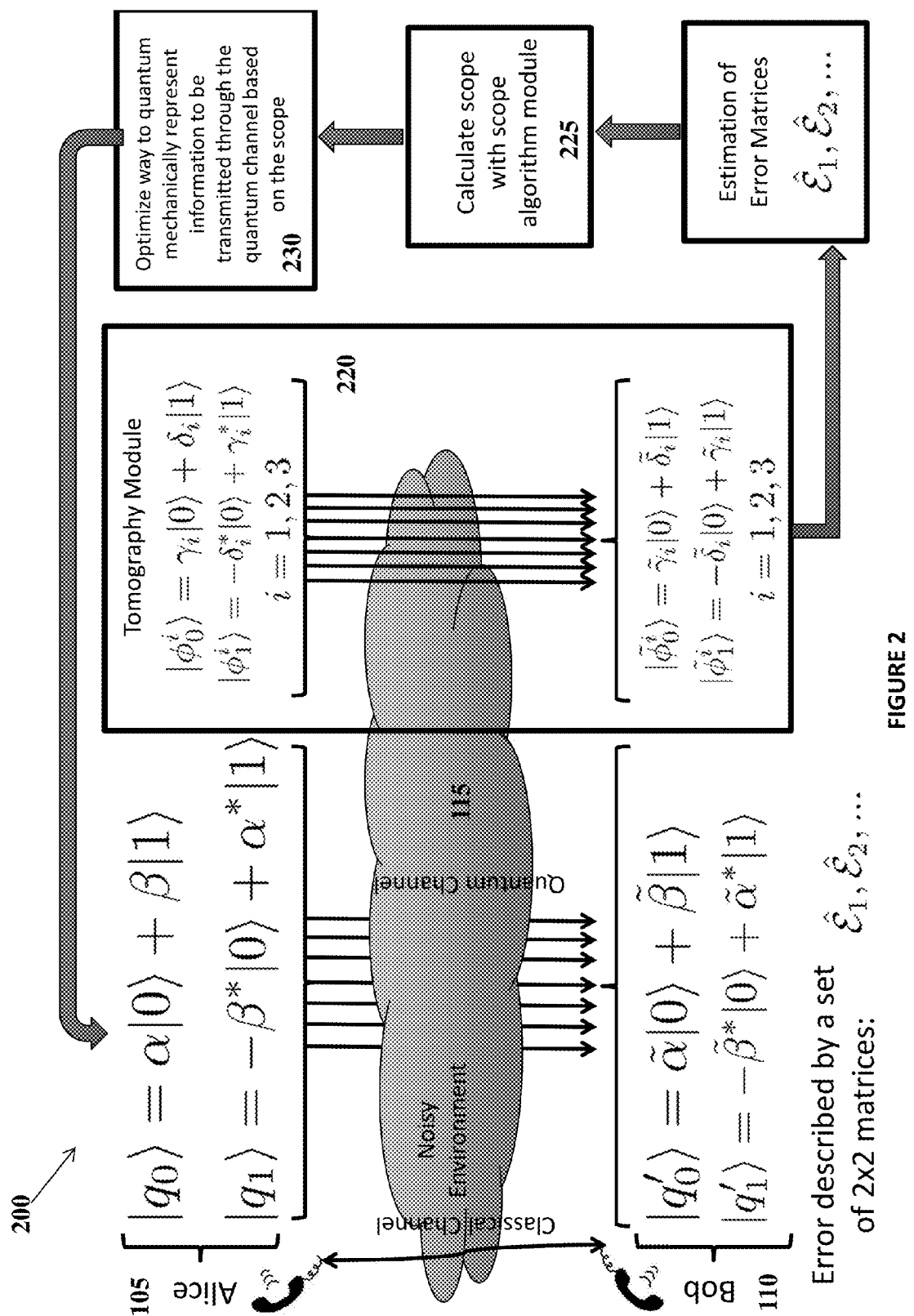
FIG. 2 is a model of an adaptive quantum information processing system, in accordance with an exemplary embodiment of the invention.

Therefore, the present invention presents a system and method that can minimize the error rate so that quantum information processing systems can function efficiently in a noisy environment. FIG. 2 is a model of an adaptive quantum information processing system 200, in accordance with an exemplary embodiment of the invention. Similar to what is shown in FIG. 1, the adaptive quantum information processing system 200 of FIG. 2 is an example of a quantum communication system in which two parties, Alice 105 and Bob 110, are attempting to perform secure communications through a noisy environment 115.

In an exemplary embodiment of the invention, a computer implemented method can determine a state of a quantum channel governing an environment with a tomography module 220, wherein the tomography module can be implemented in a computer system that comprises instructions stored in a machine-readable medium and a processor that executes the instructions. More specifically, using standard tomographic techniques, the tomography module can determine the mathematical operators that describe the effect the environment has on a qubit that moves through it. Stated differently, the tomography module can build a mathematical model of how the states change in the environment. Given a quantum channel f, each basis of the state space can define a particular way to represent classical information. For each such representation, there can be an associated classical channel having a capacity all its own.

Next, in an exemplary embodiment of the invention, a scope of the quantum channel can be calculated with a scope algorithm module 225, wherein the scope algorithm module is implemented in a computer system that comprises instructions stored in a machine-readable medium and a processor that executes the instructions. The scope of the channel f can be denoted by s(f) and can represent the range of achievable classical capacities as varied over all possible representations. Intuitively, the largest value of scope can define how to represent information to maximize the amount transmitted. Alternatively, the smallest value can be used to measure the optimal performance of a method designed to interrupt communication or remove a steganographic message. If not all representations are available, then choosing the best available scope value might mean considering a value in between the maximum and minimum.

More specifically, each basis of the state space can provide a different way to represent information. For each representation, there can be an associated classical channel whose capacity measures the amount of information that can be transmitted through a quantum channel when that particular representation is used. The scope of a quantum channel can be the range of classical capacities achieved as the sender and receiver vary over all possible representations.

For example, to illustrate the idea for qubits, suppose Alice and Bob fix a basis $\{|\psi\rangle, |\phi\rangle\}$ the state space. The state $|\psi\rangle=a|0\rangle+b|1\rangle$ can represent '0', and the state $|\phi\rangle=c|0\rangle+d|1\rangle$ can represent '1'. This choice of basis can define a classical channel. Alice can send a qubit $|*\rangle$ representing '0' or '1' to Bob. As the qubit $|*\rangle$ travels, it can interact with the environment, changing to $\epsilon(|*\rangle\langle*|)$. Bob can receive and measure the qubit in the $\{|\psi\rangle, |\phi\rangle\}$ basis, obtaining a '0' or '1'. The scope of $\epsilon$ can be the range of capacities achieved as $\{|\psi\rangle, |\phi\rangle\}$ varies over all bases of the state space.

Therefore, as is clear, calculating the scope of a quantum channel is not a trivial matter. However, by switching to the Bloch representation, calculating for scope for examples like bit flipping can be performed, and a systematic method can be developed for calculating the scope of any unital qubit channel. Therefore, it must be understood how to calculate the classical channels associated to a qubit channel in its Bloch representation.

In order to calculate scope, a simpler representation of quantum channels is needed, and the Bloch representation can be utilized. After studying the Bloch representation, an elementary characterization of the channels can be obtained: the unital qubit channels, which occur naturally in communication as conservative models of noise. It turns out that such a channel can always be canonically represented by a convex sum of rotations in R3. The channels can then be used to establish that qubit unitality is the quantum analogue of a binary symmetric channel. A systematic method for solving scope can then be that each unital channel can be replaced by a symmetric unital channel with the same scope—but the scope of a symmetric channel can be calculated from its eigenvalues. It can be shown that each symmetric channel can be a convex sum of four involutive rotations, which collectively comprise a copy of the Klein-four group.

More specifically, given a quantum channel f determined by the tomography module, to calculate scope, the scope algorithm module can first form:

$$\varphi(f) = \frac{1}{2}f + \frac{1}{2}f^t$$

A real n×n matrix A is symmetric when A=At. The eigenvalues of a symmetric matrix are real and there are exactly n of them: $(\lambda 1, \ldots, \lambda n)$, though they are not all necessarily distinct. A standard fact about symmetric matrices is that $$\sup_{|x|=1}(x, Ax) = \max_{1 \leq i \leq n} \lambda i \quad \& \quad \inf_{|x|=1}(x, Ax) = \min_{1 \leq i \leq n} \lambda i.$$

First, each f∈U can be written as f(x)=Mx where M is a real 3×3 matrix. If the matrix M happens to be symmetric, then the module can calculate the scope of f by simply finding the largest and smallest eigenvalues of M. This in turn requires solving the characteristic equation of M, which means finding the zeroes of a third degree polynomial with real coefficients, and even a formula exists for these.

A unital channel is called symmetric when f=ft. The class of symmetric unital channels can be denoted S. Let f be a symmetric unital channel with eigenvalues $\lambda 1 \leq \lambda 2 \leq \lambda 3$. Then $$s(f) = \left[\frac{(1 + \text{sgn}(\lambda_1 \lambda_3))}{2}\left(1 - H\left(\frac{1 + \min|\lambda_i|}{2}\right)\right), 1 - H\left(\frac{1 + \max|\lambda_i|}{2}\right)\right]$$

where sgn(x)=x/|x| for x≠0 and sgn(0)=0.

After calculating the scope, in an exemplary embodiment of the invention, the scope can be utilized to optimize the way to quantum mechanically represent information to be transmitted through the quantum channel. This step can be performed with an optimization module 230, wherein the optimization module can be implemented in a computer system that comprises instructions stored in a machine-readable medium and a processor that executes the instructions. More specifically, the scope calculation can be utilized to determine the best way to quantum mechanically represent information so that the error rate is minimized. In quantum information processing systems, the ability to perform scope calculations can be used to minimize the error rate in protocols like QKD, leading to an adaptive quantum communication. When this technique is applied to quantum cryptography, it can minimize the error rate over any time interval where the environment remains stable; and, for familiar forms of noise, like bit flipping, the error rate can be cut in half.

The advantage of the present invention over traditional quantum communication is that it can enable the protocol to "adapt" to its current environment; i.e., to determine the optimal way of quantum mechanically representing information so that the error rate is minimized. This increases the ability of a quantum communication scheme to function efficiently in a noisy environment in many cases where it ordinarily would not. This advantage is made possible by three features believed to be new: the invention of a mathematical concept called "scope," an algorithm for calculating scope and the use of the algorithm in optimizing the performance of standard quantum communication.

In accordance with an alternative exemplary embodiment, the calculated scope can be utilized in classifying physical effects according to the degree that they disturb the state of a system. For example, instead of optimizing the channel to transmit the most information, the smallest scope value could be used to measure the optimal performance of a method designed to interrupt communication, or remove a steganographic message. A 'weak effect' could be a channel with scope close to [1, 1]. Other examples of weak effects could be projective measurements as they always have scope [0, 1], which is a maximum distance from [1, 1], indicating that the disturbance caused by such an effect is extreme. More specifically, disturbing the state of the system can be caused by generating a lot of noise to interfere with a quantum communication between two other parties.

In quantum cryptography, the number of bits we can transmit requires a key of the same size, so the speed at which we transmit information depends on how fast we can generate keys. If the error rate within a session of QKD is too high, we have to start over: this slows the key generation rate. Key generation rates are important not only because it is desirable to communicate as fast as possible, but also because there are times when it is the only way for communication to be possible: for instance, in freespace, we have at best 5-6 minutes to transmit information to a satellite before it is out of reach. By minimizing the error rate, we can avoid restarting and speed up the rate at which information is transmitted. We now indicate how the theory of scope can be used to develop a method for minimizing the error rate in quantum cryptography . . . we call it adaptive quantum cryptography.

(i) For each $i \in \{1, 2, 3\}$. Alice sends many 0's prepared in the $e_i$ basis to Bob (ii) For each $i \in \{1, 2, 3\}$, Bob measures one third of them in the $e_1$ basis, one third in the $e_2$ basis and one third in the $e_3$ basis (iii) Bob calculates the channel f which governs the noise in the environment. First, he uses the measurement results from (ii) to estimate the probability $p_{ij}$ that $e_i$ is received when $e_j$ is sent. But since the element $f_{ij}$ off located at position (i, j) is related to $p_{ij}$ via $$p_{ij} = \frac{1 + (e_i, f(e_j))}{2} = \frac{1 + f_{ij}}{2}$$

these probabilities allow Bob to construct f!

(iv) Bob calculates the scope s(f) and an eigenvector r associated to $f^+$, (v) Alice and Bob agree to engage in QKD using r and a forty five degree rotation of r . . . this requires use of a private key so that Bob can transmit the information about r to Alice, but once done, all future communication will be at a faster rate assuming a stable environment.

Portions of the invention can comprise a computer program that embodies the functions described herein. Furthermore, the modules described herein, such as the tomography module, scope algorithm module, and optimization module, can be implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer is explained herein in more detail read in conjunction with the figures illustrating the program flow.

It should be understood that the foregoing relates only to illustrative embodiments of the present invention, and that numerous changes may be made therein without departing from the scope and spirit of the invention as defined by the following claims.

The invention claimed is:

1. A method for configuring a device that communicates through a quantum channel governing a physical environment, the method comprising:
    determining a mathematical model describing the quantum channel;
    determining, based on the determined mathematical model of the quantum channel, a scope of the quantum channel;
    determining, using a processor, an eigenvector corresponding to a largest value of the scope;
    configuring the device to engage in quantum key distribution (QKD) with a satellite through the quantum channel by using a private key to transmit information about the eigenvector; and
    engaging in QKD with the satellite through the quantum channel, using the configured device, based on the determined eigenvector and a degree of rotation of the eigenvector.

2. The method of claim 1, wherein determining the scope of the quantum channel comprises determining the scope based on an equation:

$$s(f) = \left[\frac{(1 + \mathrm{sgn}(\lambda_1 \lambda_3))}{2}\left(1 - H\left(\frac{1 + \min|\lambda_i|}{2}\right)\right), 1 - H\left(\frac{1 + \max|\lambda_i|}{2}\right)\right],$$

wherein s(f) represents the scope of a symmetric unital channel f, wherein symmetric unital channel f has eigenvalues $\lambda 1 \leq \lambda 2 \leq \lambda 3$, and wherein H represents entropy for the quantum channel.

3. The method of claim 1, further comprising utilizing the largest value of the scope to maximize an amount of information transmitted through the quantum channel.

4. The method of claim 1, further comprising utilizing a smallest scope value to measure a performance of a method designed to interrupt a communication through the quantum channel.

5. The method of claim 1, wherein configuring the device to engage in QKD through the quantum channel using the eigenvector enables the device to communicate faster through the quantum channel.

6. A system for communicating through a quantum channel governing a physical environment, the system comprising:
   a communication device configured to communicate through the quantum channel;
   a tomography module configured to determine a mathematical model describing the quantum channel;
   a scope algorithm module configured to determine, based on the determined mathematical model of the quantum channel, a scope of the quantum channel and an eigenvector corresponding to a largest value of the scope; and
   an optimization module configured to configure the communication device to engage in quantum key distribution (QKD) with a satellite through the quantum channel by using a private key to transmit information about the eigenvector and
   to engage in QKD with the satellite through the quantum channel, using the configured communication device, based on the eigenvector and a degree of rotation of the eigenvector.

7. The system of claim 6, wherein the scope algorithm module is configured to determine the scope of the quantum channel based on an equation:

$$s(f) = \left[ \frac{(1 + \text{sgn}(\lambda_1 \lambda_3))}{2} \left( 1 - H\left( \frac{1 + \min|\lambda_i|}{2} \right) \right), 1 - H\left( \frac{1 + \max|\lambda_i|}{2} \right) \right],$$

wherein s(f) represents the scope of a symmetric unital channel f, wherein symmetric unital channel f has eigenvalues $\lambda 1 \leq \lambda 2 \leq \lambda 3$, and wherein H represents entropy for the quantum channel.

8. The system of claim 6, wherein the optimization module is configured to utilize the largest value of the scope to maximize an amount of information transmitted through the quantum channel.

9. The system of claim 6, wherein the optimization module is configured to utilize a smallest scope value to measure the performance of a method designed to interrupt a communication.

10. The system of claim 6, wherein configuring the communication device to engage in QKD through the quantum channel using the eigenvector enables the communication device to communicate faster through the quantum channel.

11. A device for communicating with a satellite through a quantum channel governing a physical environment, the device comprising:
    a tomography module configured to determine a mathematical model describing the quantum channel;
    a scope algorithm module configured to determine, based on the determined mathematical model of the quantum channel, a scope of the quantum channel and an eigenvector corresponding to a largest value of the scope; and
    an optimization module configured to configure a communication device to engage in quantum key distribution (QKD) with the satellite through the quantum channel by using a private key to transmit information about the eigenvector and to
    engage in QKD with the satellite through the quantum channel, using the configured communication device, based on the determined eigenvector and a degree of rotation of the eigenvector.

12. The device of claim 11, wherein the optimization module is further configured to:
    determine an efficient way to quantum mechanically represent information to be transmitted through the quantum channel.

13. The device of claim 11, wherein the scope algorithm module is configured to determine the scope of the quantum channel based on an equation:

$$s(f) = \left[ \frac{(1 + \text{sgn}(\lambda_1 \lambda_3))}{2} \left( 1 - H\left( \frac{1 + \min|\lambda_i|}{2} \right) \right), 1 - H\left( \frac{1 + \max|\lambda_i|}{2} \right) \right],$$

wherein s(f) represents the scope of a symmetric unital channel f, wherein symmetric unital channel f has eigenvalues $\lambda 1 \leq \lambda 2 \leq \lambda 3$, and wherein H represents entropy for the quantum channel.

14. The device of claim 11, wherein the optimization module is configured to utilize the largest value of the scope to maximize an amount of information transmitted through the quantum channel.

15. The system of claim 11, wherein the optimization module is configured to utilize a smallest scope value to measure the performance of a method designed to interrupt a communication.

16. The device of claim 11, wherein engaging in QKD with the satellite through the quantum channel using the private key enables the device to communicate faster through the quantum channel with the satellite.

* * * * *